United States Patent [19]
Hamilton

[11] 3,735,603
[45] May 29, 1973

[54] LIQUID REFRIGERANT FEED CONTROL

[75] Inventor: Clark B. Hamilton, Hartford, Conn.

[73] Assignee: Dunham-Bush, Inc., Hartford, Conn.

[22] Filed: Aug. 12, 1971

[21] Appl. No.: 171,081

[52] U.S. Cl. .................62/210, 62/225, 62/226
[51] Int. Cl. ..............................F25b 41/00
[58] Field of Search................62/196, 204, 210, 62/202, 222, 224, 225, 226

[56] References Cited
UNITED STATES PATENTS

| | | | |
|---|---|---|---|
| 3,478,534 | 11/1969 | Matthies | 62/225 |
| 3,577,743 | 5/1971 | Long | 62/225 |
| 3,408,827 | 11/1968 | Soumerai | 62/196 |
| 2,534,455 | 12/1950 | Koontz | 62/223 |
| 2,583,178 | 1/1952 | Huntington | 62/223 |
| 3,397,552 | 8/1968 | Harnon | 62/202 |

Primary Examiner—Meyer Perlin
Attorney—Richard C. Sughrue, Gideon Franklin Rothwell, John H. Mion et al.

[57] ABSTRACT

The quality of the suction gas at the input of a variable capacity compressor in a refrigeration system is controlled by regulating the flow of liquid refrigerant from the condenser to the evaporator in the system. A thermistor at the input of the compressor senses the quality or gas-liquid ratio of the suction gas and controls the position of a liquid refrigerant flow valve to control the flow rate of the liquid refrigerant, thereby controlling the quality of the suction gas at the input to the compressor. The position of the liquid refrigerant flow valve may also be controlled in accordance with the capacity setting of a variable capacity compressor.

2 Claims, 2 Drawing Figures

PATENTED MAY 29 1973

3,735,603

INVENTOR
CLARK B. HAMILTON

BY Sughrue, Rothwell, Mion, Zinn & Macpeak

ATTORNEYS

LIQUID REFRIGERANT FEED CONTROL

BACKGROUND OF THE INVENTION

1. Field of the Invention

The invention relates generally to a refrigeration system including a compressor, condenser, and evaporator, and more particularly to a means and method of controlling the flow rate of liquid refrigerant through the evaporator.

2. Description of the Prior Art

In the prior art, in a refrigeration system including a flooded chiller-evaporator, a condenser, and a variable capacity compressor having a variable capacity capability, such as disclosed in U.S. Pat. No. 3,408,827, the compressor load or capacity is determined by a control which is responsive to a sensor which senses the temperature of the cooling water leaving or entering the evaporator. The water is maintained at a constant temperature by activating a device in the compressor which varies the compressor capacity, i.e. the compression ratio, or more specifically, the pumped mass flow rate. This varying rate of mass flow through the compressor, and consequently through the condenser and evaporator, requires a variable liquid control device for modulating the liquid refrigerant mass flow from the condenser to the evaporator more or less in response to the compressor mass flow rate, to prevent over or under-feeding of the evaporator and the resulting system shutdown.

This pprevention of over- or under-feeding is normally done by one of the following means:

1. Maintaining a constant liquid level in the condenser (i.e. "high side float");
2. Maintaining a constant liquid level in the evaporator (i.e. "low side float");
3. Variable subcooling control (i.e. "fixed orifices in series ");
4. A constant evaporator pressure regulator; and
5. A thermal expansion valve control.

All of these foregoing methods have various drawbacks in that some compromise has to be made in their application with a resulting adverse effect on system performance, cost or operation range.

SUMMARY OF THE INVENTION

The board object of the invention is to provide an improved method and means of liquid refrigerant feed control in a refrigeration system.

A more specific object of the invention is to provide an improved method and means of maintaining the compressor mass flow rate and the liquid refrigerant mass flow rate from the condenser to the evaporator in the refrigeration system substantially equal.

Another object of the invention is to sense the quality of the suction gas at the input of the compressor and to control the liquid refrigerant mass flow rate from the condenser to the evaporator in accordance with the sensed quality, in order to keep the suction gas quality at a desired optimum value.

Still another object of the invention is to control the refrigerant mass flow rate from the chiller to the condenser in accordance with the load or capacity of a variable capacity compressor, thereby maintaining the compressor mass flow rate and the liquid flow rate from the condenser to the evaporator at substantially the same value without time lag.

A more specific object of the invention is to control the position of a liquid refrigerant control valve between the condenser and the evaporator by the output of an electrical bridge circuit which has inputs corresponding both to the compressor capacity setting and to the quality of the suction gas at the input to the compressor.

The invention may be briefly summarized as a liquid refrigerant feed control system for a variable capacity compressor in a refrigeration system wherein the position of a liquid refrigerant flow control valve placed between the condenser and the evaporator is controlled directly by the compressor capacity setting to maintain the liquid refrigerant flow rate into the evaporator substantially equal to the compressor mass flow rate. Furthermore, a refrigerant vapor quality sensing means may be placed in the input line of the compressor to sense the quality of the compressor suction gas to make fine adjustments in the position of the flow control valve to maintain the suction gas quality at a desired optimum value regardless of changes in the system refrigerant charge, operating pressures, oil foaming in the evaporator, and the like.

DESCRIPTION OF THE PREFERRED EMBODIMENT

Figure 1:
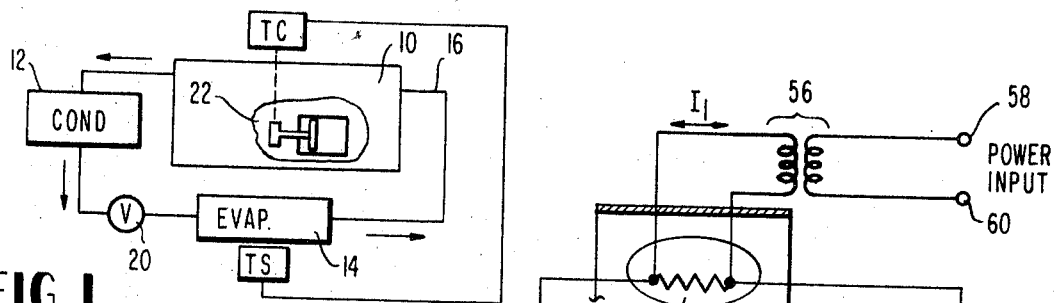
FIG. 1 is a schematic diagram of one form of refrigeration system to which the liquid refrigerant control of this invention may be applied.

FIG. 1 illustrates a conventional prior art refrigeration system in which the liquid refrigerant feed control of this invention is particularly useful. A variable capacity, i.e. variable displacement compressor 10 pumps refrigerant at a certain mass flow rate through a condenser 12 and an evaporator or chiller 14 and then back to the input or suction line 16 of the compressor. A liquid refrigerant flow control valve 20 is inserted in the line between the condenser and the evaporator. In the conventional operation of this type of system, the compressor is continuously operating and the cooling capacity or displacement of the compressor is determined by the position of a capacity control slide valve 22 whose position is controlled by a temperature controller TC which in turn is controlled by a thermostat TS which senses the temperature of the water entering or leaving the evaporator-chiller 14. Conventionally, the compressor is continuously running, and the position of the valve 20 is controlled by one of the means outlined above.

Figure 2:
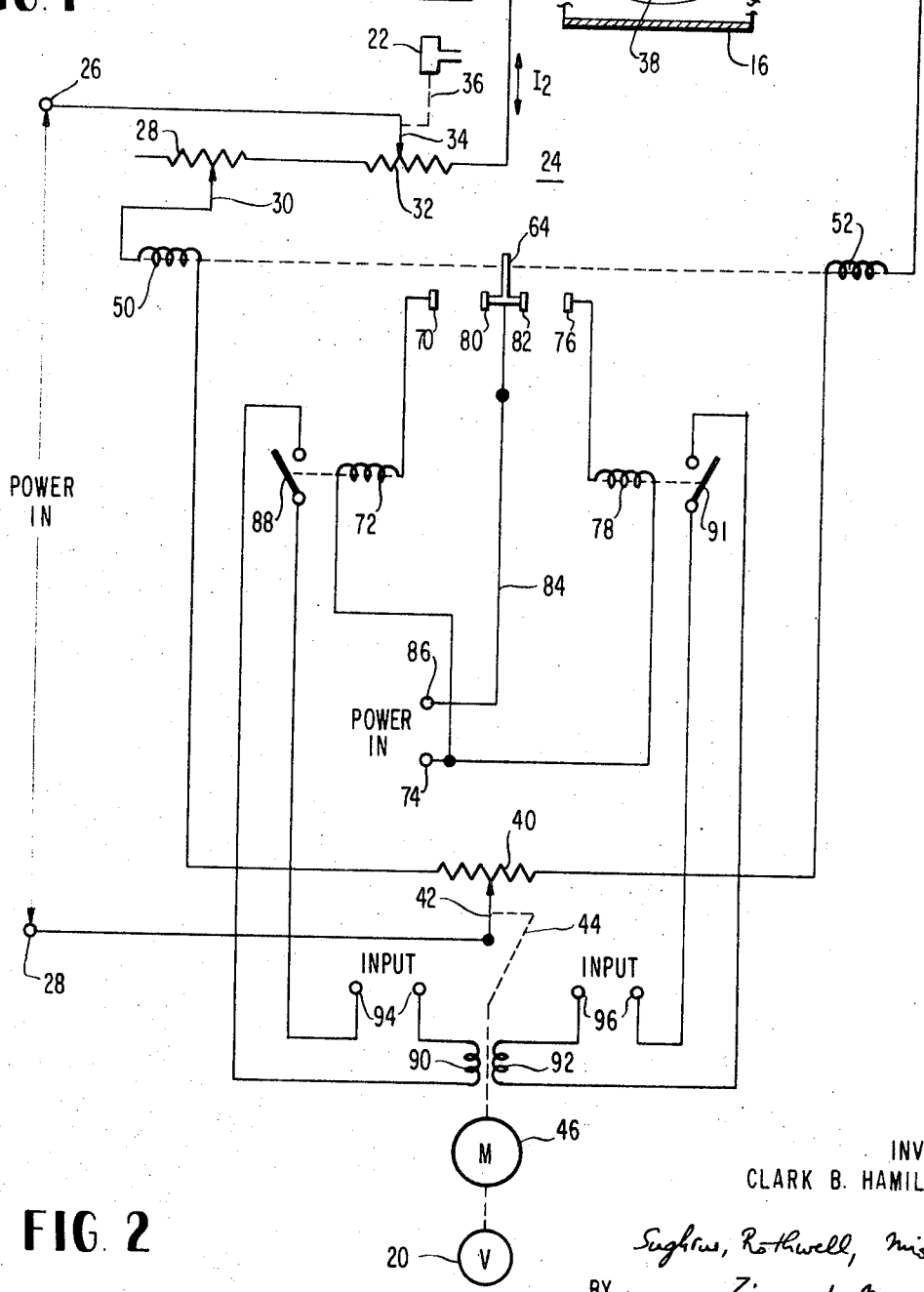
FIG. 2 is a schematic diagram of a preferred embodiment of the liquid refrigeratnt feed control of this invention.

FIG. 2 illustrates a preferred embodiment of the present invention as applied to the refrigeration system illustrated in FIG. 1. The same reference numerals have been used to identify corresponding components of FIGS. 1 and 2.

The preferred embodiment of the liquid refrigerant feed control of the present invention consists of a bridge circuit 24 having a pair of input terminals 26 and 28 across which may be connected a suitable source of a.c. or d.c. power. The bridge circuit 24 consists essentially of four variable resisistance devices: a rheostat 28 having a movable wiper arm 30 which is adjusted to calibrate the circuit; a potentiometer 32 having an adjustable wiper arm 34 which is connected by a mechanical linkage 36 to the compressor capacity control slide valve 22 in the variable capacity compressor 10; a self-heated thermistor 38 which is placed inside the compressor input or suction line 16 to sense the quality of the suction refrigerant gas; and a potentiometer 40 having a movable wiper arm 42 which is connected via a mechanical linkage 44 to a reversible motor 46 which controls the position of valve 20 and thereby the liquid refrigerant flow rate between condenser 12 and the evaporator 14. Therefore, the position of wiper arm 42 on the potentiometer 40 is continuously determined by the position of the valve 20.

When a voltage is applied across the terminals 26 and 28, electrical current flows from terminal 26 through two parallel paths in the bridge circuit 24 back to terminal 28. The first path is from input terminal 26 through the wiper arm 34 and the left-hand portion of potentiometer 32 through the rheostat 28 and the wiper arm 30, and then through a relay coil 50, the left-hand portion of potentiometer 40, wiper arm 42 and then back to the input terminals 28. The second path is from the input terminal 26 through the wiper arm 34, the right-hand portion of potentiometer 32 and then through the thermistor 38, another relay coil 52, and the right-hand portion of potentiometer 40 and its wiper arm 42 back to the input terminal 28.

Thermistor 38 is an example of a sensing means which may be used to sense the amount of liquid carried in a gas stream, i.e. the quality, of the suction gas at the input of the compressor 10. The termistor is of the self-heating type and is connected through an isolating transformer 56 to a pair of power input terminals 58 and 60. The transformer provides power to heat the thermistor but is electrically isolated from bridge circuit 24 so that the thermistor heating current $I_1$ and the bridge circuit current $I_2$ are independent of each other.

The thermistor has a negative temperature coefficient, that is, its resistance decreases as its temperature increases. The temperature of the thermistor changes as the quality of the suction gas changes. This temperature change extends, for example, from approximately 35°F when the refrigerant is 100 percent liquid at 35°F evaporator temperature to approximately 250°F when the refrigerant is 100 percent gas at 35°F evaporator temperature. The thermistor is normally heated to a temperature very much higher than the temperature of the suction gas. The greater the amount of liquid in the suction gas, the greater the cooling effect on the thermistor due to vaporization of the liquid as it flows over the thermistor. Therefore, the thermistor is at its highest temperature when the refrigerant is 100 percent gas. Because of this large temperature change of the thermistor due to changes in quality of the refrigerant, the thermistor sensor is relatively unaffected by the relatively small normal temperature variations of the suction gas.

Relay coils 50 and 52 are magnetically linked to a movable armature 64 which is normally floating in a neutral or centered position, as illustrated; that is, when bridge 22 is balanced, the current through neither of the coils 50 and 52 is sufficient to produce a magnetic field strong enough to attract armature 64 which then remains in the position illustrated in FIG. 2. A fixed relay contact 70 is connected through a power relay coil 72 to a power input terminal 74. Another fixed relay contact 76 is connected through another power relay coil 78 to the input terminal 74. Movable switch contacts 80 and 82 are connected via a conductor 84 to the other power input terminal 86. When relay coil 72 is energized, it closes a normally open switch 88 which is connected in series with the forward drive winding 90 of the reversible motor 46. In like manner, when relay coil 78 is energized, it closes a normally open switch 91 which is connected in series with the reverse drive winding 92 of motor 46. Power is applied to terminals 94 and 96 and then to the motor drive winding corresponding to the closed one of the switches.

In operation, the calibration rheostat wiper arm 30 is adjusted to balance the bridge circuit 24 for normal operating conditions. As an example, the rheostat is adjusted so that the bridge is balanced when the quality of the compressor suction gas as sensed by thermistor 38 is 95 percent, i.e. the gas contains 5 percent of droplets of liquid refrigerant.

When the quality of the suction gas increases to 97 percent, for example, the temperature of the thermistor in the suction gas in the compressor inlet pipe 16 increases and the resistance of thermistor 38 decreases, thereby unbalancing the bridge circuit 24 so that more current flows through coil 52 and less current flows through coil 50. When the current through relay 52 reaches a predetermined value determined by the design characteristics of the relay, armature 64 is attracted to the right, thereby closing contacts 76 and 82 and energizing power relay coil 78 which closes switch 91. Consequently, the reverse winding 92 of motor 46 is energized to open valve 20, and thereby increase the flow rate of liquid refrigerant from the condenser 12 to the evaporator 14.

Motor 46 also moves the wiper arm 42 to the left a distance proporational to the change of position of valve 20 to rebalance the bridge circuit, and thereby maintain valve 20 in its new position until the bridge is again unbalanced by a change in the quality of the suction gas. When the bridge is rebalanced, the current through relay coil 52 drops to a value insufficient to keep contacts 76 and 82 closed, and armature 64 will return to the central position as illustrated, thereby de-energizing relay 78 and opening switch 91.

In like manner, if the quality of the compressor suction gas drops, for example to 93 percent, the temperature of the thermistor 38 decreases and its resistance increases, thereby increasing the current flow through relay coil 50 and decreasing the current flow through relay coil 52. Consequently, armature 64 will be attracted to the left to close contacts 70 and 80, thereby energizing power relay coil 72 to close switch 88 and energize the forward drive winding 90 in the reversible motor 46. This will cause motor 46 to change the position of valve 20 so that the liquid refrigerant flow rate therethrough is decreased.

The bridge circuit 24 is again rebalanced because motor 46 moves the wiper arm 42 to the right to increase the resitance in the path through relay coil 50, thereby balancing the current flow through relay coils 50 and 52 so that armature 64 again returns to its neutral or central position as illustrated. Therefore, contacts 70 and 80 are opened, relay coil 70 is de-energized, switch 88 is opened, and motor drive winding 90 is de-energized, so that valve 20 remains in its new position until the bridge circuit is again unbalanced by a change in the quality of the suction gas.

The balance of the bridge 24 is also determined by the position of the wiper arm 34 on the potentiometer 32. Wiper arm 34 is connected via mechanical linkage 36 to the compressor capacity control slide valve 22 in the compressor 10. If the position of the slide valve 22 changes due to a change in compressor capacity, the position of the wiper arm 34 is correspondingly changed, thereby unbalancing the electrical current flowing through the relay coils 50 and 52. In a manner similar to that already described, when the unbalancing becomes great enough, armature 64 is attracted to close either contacts 70, 80 or 76, 82 to energize one of the motor drive windings 90 and 92 of the reversible motor 46, which then changes the position of the liquid refrigerant flow control valve 20 to compensate for the change in compressor capacity as reflected by the change in position of the slider valve 22. Again, as previously described, the bridge is rebalanced by means of mechanical linkage 44 connected between the motor 46 and the wiper arm 42 of the bridge potentiometer 40.

More specifcally, when the compressor capacity increases, slide valve 22 moves wiper arm 34 to the right, thereby causing contacts 76 and 82 to close so that refrigerant flow control valve 20 is moved to a more fully open position to increase the flow of liquid refrigerant from condenser 12 to evaporator 14. Consequently, the compressor mass flow rate and the liquid refrigerant mass flow rate through valve 20 are kept essentially the same at all times without any time lag.

The signal introduced into bridge circuit 24 by thermistor 38 makes appropriate fine adjustments in the position of the flow control valve 20 to keep the suction gas quality at a desired optimum value, e.g. 95 percent, regardless of changes in the system refrigerant charge, operating pressures, oil foaming in the evaporator, and the like.

In an alternative embodiment, potentiometer 32 and its wiper arm 34 are replaced by a dummy resistor so that only thermistor 38 provides the control signal to bridge 24 for controlling the position of flow control valve 20. In this case, valve 20 is not controlled by the capacity setting of the slide valve 22 of compressor 10, but rather is controlled solely by the quality of the suction gas. This control is important in oil-injected screw compressors, because too low a suction gas quality affects the efficiency of the oil separator.

While the invention has been particularly shown and described with reference to the preferred embodiment thereof, it will be understood by those skilled in the art that various changes in form and details may be made therein without departing from the spirit and scope of the invention as defined in the appended claims. More specifically, even through the bridge circuit 24 has been described as an electromechanical circuit, an equivalent transistorized circuit is within the scope of the invention.

I claim:

1. In a refrigeration system including a compressor, a condenser and an evaporator connected in series in a closed loop wherein the compressor is a load controlled variable capacity compressor and the rate of flow of liquid refrigerant to the evaporator is controlled in accordance with the capacity of the compressor to maintain the liquid refrigeraant flow rate through the evaporator substantially equal to the mass flow rate through the compressor, the improvement comprising:
   a. valve means for controlling the rate of flow of liquid refrigerant into the evaporator;
   b. quality sensing means for producing a first control signal indicative of the quality of the refrigerant suction gas at the input of the compressor;
   c. circuit means responsive to said first control signal for controlling the position of said valve means to control said rate of flow of liquid refrigerant so that the quality of the suction gas is maintained at a desired optimum valve;
   d. compressor capacity sensing means for producing a second control signal indicative of the capacity of the compressor; and
   e. said circuit means being additionally responsive to said second control signal to control the position of said valve means in accordance with both said first and second control signals so that said rate of flow of liquid refrigerant is controlled by both the capacity of the compressor and also the quality of the refrigerant suction gas at the input of the compressor.

2. A liquid refrigerant feed control as defined in claim 1 wherein said circuit means comprises:
   a. a normally balanced bridge circuit having first and second circuit paths normally carrying substantially equal currents;
   b. means connecting said quality sensing means in said first circuit path;
   c. means connecting said capacity sensing means in said second circuit path;
   d. first relay means connected in said first circuit path;
   e. second relay means connected in said second circuit path; and
   f. valve position control means connected to said valve means and selectively responsive to the operation of said first and second relay means for changing the position of said valve means, whereby changes in said first and second control signals unbalance said bridge circuit to cause unequal currents to flow in said first and second circuit paths, thereby operating one of said relay means to operate said valve position control means which changes the position of said valve means so that said rate of flow of the liquid refrigerant is determined by both of said first and second control signals.

* * * * *